United States Patent [19]

Douek et al.

[11] 3,993,815

[45] Nov. 23, 1976

[54] ANAEROBIC PRESSURE SENSITIVE ADHESIVE STOCKS

[75] Inventors: Maurice Douek, Los Angeles; Gustav A. Schmidt, South Pasadena, both of Calif.; Bernard M. Malofsky, Bloomfield; Martin Hauser, West Hartford, both of Conn.

[73] Assignees: Avery Products Corporation, San Marino, Calif.; Loctite Corporation, Newington, Conn.

[22] Filed: Oct. 7, 1974

[21] Appl. No.: 512,940

[52] U.S. Cl. .................. 428/40; 156/331; 156/332; 260/27 R; 260/859 R; 260/859 PV; 260/873; 260/899; 260/901; 428/138; 428/423; 428/483; 423/510; 423/520; 423/914
[51] Int. Cl.² .................. B32B 27/26; B32B 27/30
[58] Field of Search ........... 151/14.5, 7; 161/167, 161/146, 406, 190, DIG. 1, 113; 117/122 D; 260/901, 89.5 R, 88.3 R; 252/182, 316; 156/310, 331, 332; 428/423, 483, 510, 520, 354, 424

[56] References Cited
UNITED STATES PATENTS

| 2,294,347 | 8/1942 | Bauer et al. | 161/146 |
|---|---|---|---|
| 2,688,582 | 9/1954 | Phair et al. | 161/113 |
| 3,300,547 | 1/1967 | Gorman et al. | 260/89.5 R |
| 3,425,988 | 2/1969 | Gorman et al. | 161/190 |
| 3,464,883 | 9/1969 | Moline et al. | 161/406 |
| 3,468,744 | 9/1969 | Reinhart | 161/406 |
| 3,526,558 | 9/1970 | Beeson | 161/406 |
| 3,591,438 | 7/1971 | Toback et al. | 156/310 |
| 3,616,040 | 10/1971 | Toback | 156/331 |
| 3,625,875 | 12/1971 | Frauenglass | 151/14.5 |
| 3,632,386 | 1/1972 | Hurst | 428/40 |
| 3,639,500 | 2/1972 | Muny et al. | 161/406 |
| 3,826,756 | 7/1974 | Bachmann et al. | 161/DIG. 1 |

Primary Examiner—George F. Lesmes
Assistant Examiner—R. J. Roche
Attorney, Agent, or Firm—Christie, Parker & Hale

[57] ABSTRACT

There are provided curable anaerobic pressure sensitive adhesive stocks in the form of sheets and tapes in which the adhesive is contained between two differential release surfaces. This construction permits total pressure sensitive adhesive transfer to a substrate which is to be firmly secured to another substrate upon the exclusion of oxygen and initiation of cure of the anaerobic resin.

The adhesive layer provided may be homogeneous or heterogeneous, and there may be contained within the adhesive layer a support layer.

The release liner employed is preferably impervious to migration of contained compounds which serve as the accelerators for cure of the curable anaerobic resin.

28 Claims, 4 Drawing Figures

ANAEROBIC PRESSURE SENSITIVE ADHESIVE STOCKS

BACKGROUND OF THE INVENTION

Anaerobic adhesive systems are those which are stable in the presence of oxygen, but will polymerize in the absence of oxygen. Polymerization is initiated by the presence of a peroxy compound. The cured cross-linked resins serve as sealants and as adhesives.

Typical resin monomers are terminated with polymerizable acrylate esters such as methacrylate, ethacrylate and chloroacrylate esters. The other ingredients typically present are an initiator, preferably an organic hydroperoxide such as cumene hydroperoxide, tertiary butyl hydroperoxide and the like. There is also normally provided a stabilizer against free radical initiation such as a quinone or hydroquinone, in an amount sufficient to prevent premature polymerization of the adhesive due to decomposition of the peroxy compound. There are also preferably present one or more accelerators which are typically nitrogen-containing compounds such as tertiary amines, imides, sulfamides and the like which promote the rate of cure.

Cure will be accelerated by the presence of a suitable metal, such as a transition metal, or its ion.

An anaerobic adhesive is applied to one or both of the surfaces to be joined. When the two surfaces are joined and oxygen excluded, cure will be initiated. As is well known, surfaces such as glass may require application of a suitable accelerator such as a transition metal compound, which will increase the rate of cure upon the substantial exclusion of oxygen or air.

Anaerobic adhesives have been well published in the art as for instance, in U.S. Pat. Nos. 2,895,950; 3,041,322; 3,043,820; 3,046,262; 3,203,941; 3,218,305; 3,300,547; 3,435,012; 3,547,851 and 3,625,875.

Anaerobic adhesive systems are typically supplied from a water-like liquid to a light-weight grease in consistency. One end-use application is to apply the adhesive to the threads of a bolt or mating nut which are then assembled. The adhesive fills the spaces between the threads which excludes oxygen and enables cure. In the normal situation, the metals present in the bolt or the nut accelerate cure.

A problem exists, however, in fixturing other surfaces together with initiation and completion of cure, and in providing a controlled quantity of anaerobic monomer to the surfaces to be bonded. No prior art composition provides the desirability and convenience of instant fixturing merely by finger pressure combined with sufficient cured strength to provide bonds of structural integrity.

SUMMARY OF THE INVENTION

According to the present invention, there are provided anaerobic pressure sensitive adhesive stocks such as sheets and tapes from which a pressure sensitive adhesive layer including an anaerobic resin system can be completely transferred to one substrate to be bonded to another, and cured upon activation by a peroxy initiator and the exclusion of oxygen.

The anaerobic pressure sensitive adhesive stocks consist of a release liner or liners which provide a differential release surface to permit separation of a pressure sensitive adhesive layer containing an anaerobic resin system from one release surface prior to separation of the layer from the other release surface.

In the situation where a tape construction is employed, the web provided by the tape can provide the differential release surfaces. In a typical situation, the surface of lowest release value is on the upper surface of a web, such that the pressure sensitive adhesive will be retained by the undersurface of the tape so that, after applying the pressure sensitive adhesive to the substrate, the pressure sensitive adhesive will then fully release from the undersurface of the tape without cohesive failure of the adhesive layer.

In the instance of sheet construction, the lower release surface is provided by at least one of the sheets or webs.

The pressure sensitive adhesive provided may be homogeneous or heterogeneous in nature.

When homogeneous in nature, it consists of an anaerobic resin system combined with a thermoplastic polymer system, the combination of which may be pressure sensitive in nature or rendered pressure sensitive by the inclusion of one or more tackifiers.

When heterogeneous, the anaerobic resin system may be separate from the pressure sensitive adhesive or combined in part with the pressure sensitive adhesive. As between the two, however, cohesive integrity is not disrupted during transfer.

As part of the construction, there may be included an interlayer, which may or may not have anaerobic properties but which will add flexural strength, particularly when lap constructions are required.

In the one construction, the webs to which the adhesive layer is applied may be impervious to the organitrogen compounds which often serve as accelerators for the anaerobic resin system, as they have been found to migrate through a conventional paper base used in conventional pressure sensitive tape and sheet constructions. Loss of the accelerator will hinder, if not prevent in an extreme case, cure. The alternative organonitrogen compounds which have a low vapor pressure at ambient temperatures may be employed as accelerators.

The presently preferred anaerobic pressure sensitive adhesive compositions employed in the construction of tapes and sheets include an anaerobic resin system containing one or more anaerobic resins dissolved in or otherwise combined with a thermoplastic polymer system of one or more high molecular weight polymers, the combination of which alone or upon inclusion of a tackifier, constituting a pressure sensitive adhesive system. To form the curable anaerobic pressure sensitive adhesive there is also added a catalyst system which is latent until made active by substantial exclusion of oxygen, preferably in combination with a suitable accelerator.

In one embodiment, if the anaerobic pressure sensitive adhesive system contains free transition metal ions, then at least the peroxy initiator may be encapsulated in microspheres which, upon rupture, and upon the exclusion of oxygen, will initiate cure. In another embodiment, a suitable metal accelerator may be encapsulated.

If metals which act as accelerators are present and an encapsulation technique is not employed, then the metals should be inactivated. This may be accomplished by scavenging each component of the system with a chelating agent, which may then be removed, if desired.

The thermoplastic polymers used in the preparation of the pressure sensitive anaerobic compositions of this invention are preferably of sufficient molecular weight so as to be elastomeric at room temperature. Further, they must be capable of being combined with the anaerobic resins and should not interfere with the creation of a cross-linked latticework of the anaerobic resins and adversely affect to any great degree the bond strength of the cured anaerobic polymer to the selected substrates to be joined.

In general, the amount of anaerobic resins combined with the thermoplastic polymer will range from about 35 to about 99% by weight based on the total weight of the anaerobic resins provided and the thermoplastic polymer(s) with which it is combined, and, if present, a tackifier but exclusive of the amount of initiator system added. The preferred amount of anaerobic resin(s) combined in the thermoplastic polymer(s) is from about 55 to about 95% by weight.

In addition, the thermoplastic polymer must be selected such that the composition alone or with tackifiers and upon the inclusion of an initiator system will form, after evaporation of essentially all the solvent, a curable pressure sensitive adhesive layer or film of sufficient cohesive strength to be applied to a substrate from differential release surfaces without disruption of the layer or film. The fully formulated, solvent free anaerobic pressure sensitive adhesive should be elastomeric at room temperature.

Further, anaerobic pressure sensitive adhesive compositions should, when applied to a surface, wet the surface and conform to the intricacies of the surface so that a uniform bond will be created upon cure and that cure will extend throughout the layer of applied anaerobic pressure sensitive composition to maximize cohesive bond strength.

To constitute a suitable pressure sensitive adhesive of this nature, the net transferable composition when free of solvent should have, prior to cure, a static shear strength of at least about 2 minutes at a 250 gram per 0.5 square inch load, and a 180° peel strength of at least about 0.5 lb. per inch, preferably at least about 1.0 lb. per inch when using standard test methods.

DESCRIPTION

According to the present invention, there are provided anaerobic pressure sensitive adhesive stocks, such as sheets and self-wound tapes, from which an adhesive layer including an anaerobic resin system can be completely transferred to one substrate to be bonded to another and cured upon the exclusion of oxygen.

Figure 1:
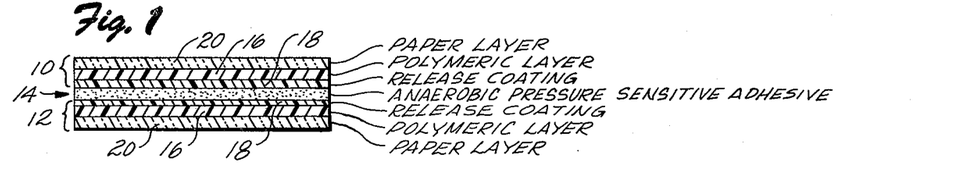
FIG. 1 - Illustrates one construction for a pressure sensitive anaerobic adhesive stock in sheet form.

With reference to FIG. 1, the basic construction for sheets consists of a first web 10 providing a release surface 18, and a second web 12 providing a second release coating between which there is contained an anaerobic pressure sensitive adhesive layer 14. The webs provide differential release surfaces to permit preferential removal of one of the webs from the adhesive layer before removal of the other.

Figure 3:
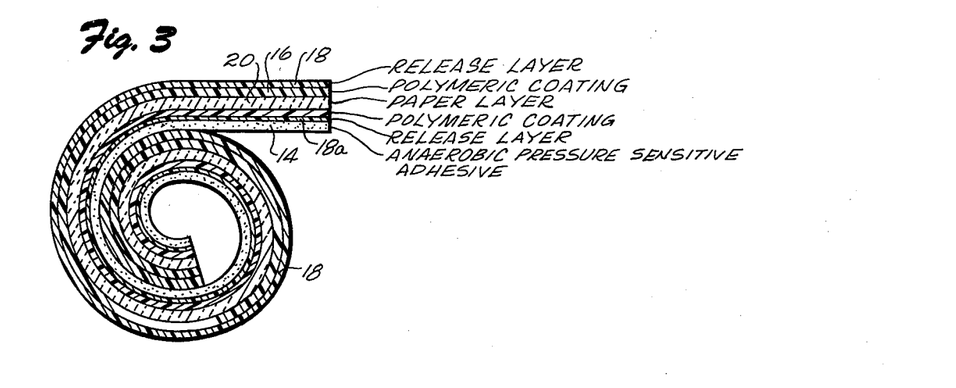
FIG. 3 - Illustrates a tape construction.

FIG. 3 illustrates a typical construction for a tape where the differential release liners 18 and 18a are contained on opposite sides of the web. Surface 18 has the highest release properties.

By the term "anaerobic resin system" as used herein, there is meant one or more anaerobic resins having at least one, preferably two, polymerizable acrylate ester moieties, normally on the ends of the backbone, which will polymerize or cure in the presence of a peroxy initiator and upon the substantial exclusion of oxygen or air, and preferably also in the presence of a suitable accelerator system.

Illustrative, but in nowise limiting, of the anaerobic resins which can be used in the preparation of pressure sensitive adhesive, compositions of the invention are polymerizable acrylate esters. As used herein, "acrylate esters" include the alphasubstituted acrylate esters, such as the methacrylate, ethacrylate, and chloroacrylate esters.

Of particular utility as adhesive monomers are polymerizable di- and other polyacrylate esters since, because of their ability to form cross-linked polymers, they have more highly desirable adhesive properties. However, monoacrylate esters can be used, particularly if the nonacrylate portion of the ester contains a hydroxyl or amino group, or other reactive substituent which serves as a site for potential cross-linking. Examples of monomers of this type are hydroxyethyl methacrylate, cyanoethyl acrylate, t-butylaminoethyl methacrylate and glycidyl methacrylate. Anaerobic properties are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

$$H_2C=C-C-O-\left[(CH_2)_{\overline{m}}\left(\begin{array}{c}R^1\\|\\C\\|\\R^3\end{array}\right)_p-C-O\right]_n-C-C=CH_2 \quad (1)$$

wherein $R^1$ represents a radical selected from the group consisting of hydrogen, lower alkyl of from 1 to about 4 carbon atoms, hydroxy-alkyl of from 1 to about 4 carbon atoms, and the radical $$-CH_2-O-C-C=CH_2 \quad (2)$$

$R^2$ is a radical selected from the group consisting of hydrogen, halogen, and lower alkyl and from 1 to about 4 carbon atoms; $R^3$ is a radical selected from the group consisting of hydrogen, hydroxyl, and (3)

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0,1.

The polymerizable polyacrylate esters utilized in accordance with the invention and corresponding to the above general formula are exemplified by, but not restricted to the following materials: di-, tri- and tetra-ethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di (chloroacrylate), diglycerol diacrylate, diglycerol tetramethacrylate, tetramethylene dimethacrylate, ethylene dimethacrylate, neopentyl glycol diacrylate and trimethylol propane triacrylate.

Yet, another class of acrylate esters are those which are formed by the reaction of:

a. an acrylate ester containing an active hydrogen atom in the alcoholic moiety of the ester; with b. an organic polyisocyanate.

Compositions including this general type of ester are disclosed in U.S. Pat. No. 3,425,988. Preferably, the active hydrogen is the hydrogen of a hydroxyl or a primary or secondary amine substituent on the alcoholic moiety of the ester, and the polyisocyanate is a diisocyanate. Naturally, an excess of the acrylate ester should be used to ensure that each isocyanate functional group in the polyisocyanate is substituted.

The most preferred of the acrylate esters used in the manner described in the preceding paragraph are those in which the acrylate ester is a substituted alkyl or aryl acrylate ester, most preferably having the formula:

wherein X is where $R^5$ is a hydrogen atom or a monovalent hydrocarbon radical containing up to 10 carbon atoms, and is preferably a hydrogen atom or an alkyl or aralkyl radical with from 1 to 10 carbon atoms; $R^2$ is as defined above; and $R^4$ is an alkylene radical with from 1 to 10 carbon atoms, or a divalent aromatic radical containing up to 14 carbon atoms, preferably phenylene, biphenylene or naphthylene.

Naturally $R^5$ and $R^4$ can contain any substituents or linkages which do not adversely affect the molecule for its intended use herein.

Typical polyisocyanates which can be reacted with the above acrylate esters to form polyacrylate monomers are toluene diisocyanate, 4,4'-diphenyl diisocyanate, di-anisidine diisocyanate, cyclohexylene diisocyanate, 2-chloropropane diisocyanate, 4,4'-diphenylmethane diisocyanate, 2,2'-diethyl ether diisocyanate, 3-(dimethylamino)- pentane diisocyanate, tetrachlorophenylene diisocyanate-1,4 and trans-vinylene diisocyanate. Still other polyisocyanates that may be used are higher molecular weight polyisocyanates obtained by reacting an excess of any of the above described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, 4,4'-dihydroxydiphenyldimethylmethane and condensation products of alkylene oxides with 4,4'- dihydroxydiphenyldimethylmethane.

Other acceptable monomers which can be used in the compositions according to the invention are acrylate terminated epoxy or ester units, i.e., reaction products of acrylic acid with hydroxy terminated ester or epoxy compounds, or low polymers thereof. Also contemplated by this invention are any other anaerobically curing monomers which, with their respective initiators, accelerators and stabilizers, i.e, inhibitors, are formulated according to the instant invention into a pressure sensitive anaerobic adhesive producing the advantageous properties of the stocks of the instant invention.

Naturally, any of the above described acrylate and polyacrylate ester monomers can be used in combination, if desired.

The presently preferred anaerobic monomers are triethyleneglycol dimethacrylate; the reaction product of hydroxypropyl methacrylate with methylene-bisphenyl-4,4'-diisocyanate; a polymer formed by methacrylate capping of a 1:1 adduct of toluene diisocyanate and hydrogenated 2,2-bis (4-hydroxyphenyl) propane as well as mixtures thereof.

There may also be present reactive monomers such as acrylic acid, methacrylic acid and the like which will cross-link with anaerobic monomers.

By the term "thermoplastic polymer system," as used herein, there is meant one or more high molecular weight thermoplastic polymers which, alone or in admixture, have a high enough average molecular weight in order that the resultant curable anaerobic pressure sensitive adhesive composition will have sufficient cohesive strength to be transferred from a conventional release surface to one substrate to be bonded to another substrate, alone, or in combination with a tackifier. Suitable average molecular weight will, of course, vary depending upon the type of thermoplastic polymer or polymer mixtures used, as well as upon the tackifier or tackifiers used, if any. Although it is desired that the polymers employed be compatible with the anaerobic resin system, they may be incompatible forming a heterogeneous system which remains pressure sensitive and transferrable in nature and capable of curing.

The word combined is used herein to indicate any workable combination, regardless of its physical form, of one or more thermoplastic polymers with one or more anaerobic monomers. Thus, a given combination may be a solution or otherwise and may be homogeneous or heterogeneous, provided only that it is useful in the pressure sensitive anaerobic stock of the invention.

Typical of the thermoplastic polymers which can be used are polyvinyl chloride, polyvinyl ethers, polyvinyl acetates; acrylic based polymers; polyurethanes, polyesters, polyamides, natural and synthetic elastomers and the like as well as mixtures thereof. The preferred thermoplastic polymers are polyvinyl chloride, polyurethanes. polyesters and acrylic based polymers.

By catalyst system there is meant an acid or base catalyzed system typically containing at least one peroxy initiator, preferably, although not necessarily, at least one accelerator which is preferably an organonitrogen compound and preferably, although not necessarily, at least one stabilizer against free radical polymerization for the anaerobic resin system.

Typical of the peroxy compounds which may be employed as initiators are the hydroperoxides, preferably organic hydroperoxides of the formula $R^6OOH$, wherein $R^6$ is generally a hydrocarbon radical containing up to about 18 carbon atoms, preferably an alkyl, aryl or aralkyl radical containing from 1 to about 12 carbon atoms. Typical examples are cumene hydroperoxide, methyl ethyl ketone hydroperoxide and the like.

As accelerators there may be mentioned liquid and solid organonitrogen compounds including but not limited to organic amides such as formamide, succinimide and the like; tertiary amines such as tributylamine, triethylamine, hexamethyl pararosaniline and the like; aromatic tertiary amines such as dimethyl paratoluidene and the like; organic sulfimides such as benzoyl sulfimide and the like; as well as mixtures thereof. Organonitrogen compounds which have a low vapor pressure at ambient temperatures are particularly preferred as they have the least effect on the viscosity of the resulting composition as well as the least tendency to migrate from the composition.

Typical stabilizers are quinones, hydroquinones, and sterically hindered phenolic compounds.

Depending upon the amount of anaerobic resin system contained in the polymer system, the amount of initiator plus accelerator added will generally range from about 0.5 to about 20 percent or more by weight based on the total weight of the polymer system plus anaerobic resin system, and if present, a tackifier.

By the term anaerobic pressure sensitive adhesive, there is meant a mixture of the thermoplastic polymer system, anaerobic resin system and the catalyst system and, if desired, a tackifier, which in an essentially solvent-free state is permanently tacky at room temperature, and which firmly adheres to a variety of ordinary surfaces upon contact without the need of more than finger pressure. Further, it must conform to the surface irregularities of normal surfaces and have a sufficient shear modulus to resist removal subsequent to application to a surface.

To meet these criteria, the net, essentially solvent-free, anaerobic pressure sensitive adhesive film or layer must have static shear strength of at least 2 minutes using a 250 gram test weight and a 0.25 square inch test surface and a 180° peel strength of at least 0.5 lb per inch, preferably 1.0 lb per inch, when measured by standard tests specified herein and will separate from a conventional release surface such as a silicone coating(s) and the like, without cohesive failure.

Another useful property is tack. Tack is, in general, a measure of the ability of the adhesive to separate from one release surface and adhere sufficiently to a substrate to enable separating the cast adhesive from another release surface without cohesive failure. In this test, which is dynamic, degree of grab for a substrate and temporary adhesive deformity are inversely proportional to travel of a standard test ball as measured in inches down an inclined plane coated with the adhesive. Tack values of less than about 10 inches, preferably less than about 5 inches, are preferred.

As indicated, a tackifier may be employed to induce or enhance pressure sensitive properties. Typical tackifiers are rosins, rosin derivatives, terpenes, synthetic tackifying resins, low molecular weight polyacrylates and the like as well as mixtures thereof. The tackifiers employed in general have a molecular weight less than about 5,000, preferably below about 1,000.

By the term pressure sensitive adhesive there is meant a thermoplastic polymer which alone, in combination with one or more other thermoplastic polymers, and/or with one or more tackifiers meets the requirements for use in anaerobic pressure sensitive adhesive.

Anaerobic resins containing a cure system are normally liquid to grease-like in consistency and packaged in containers of a type where provided oxygen precludes premature gellation or cure. Molecular mobility is high and this aids stability.

When rendered less mobile as part of a pressure sensitive adhesive composition, factors change.

One has been found to be the loss of normally liquid accelerators due to diffusion of the accelerators to the surface of the adhesive layer, followed by evaporation. Another is deactivation due to peroxy initiator reaction with active metals or metal ions which may be contained in the paper normally used in release liner construction.

Accelerator loss by diffusion and evaporation can conveniently be controlled by employing accelerators having reduced vapor pressure, preferably an organonitrogen compound which is normally solid at room temperature.

Where the accelerator is normally a liquid, accelerator loss can also be controlled by providing an impervious or barrier layer to control diffusion of the accelerator.

This, as shown in FIG. 1, can be provided by thin barrier coats 16 coated with release surfaces 18, typically a silicone release agent bonded to backing papers 20.

If the barrier coat 16 is sufficiently thick so as to become a self-supporting film, then the backing papers 18 can be eliminated.

A convenient barrier coat or self-supporting film is polyethylene, particularly low density polyethylene, as low density polyethylene is normally prepared in the absence of a metal catalyst and does not contain a catalyst residue.

Other impervious polymers which are also free of available active metals or metal ions may also be employed.

Conventional or specially treated papers may be employed as the support web 18 for the release liners 10. In this instance, migration of the accelerator can be diminished or overcome by other routes.

One is to package the end product with impervious sheet construction enclosures such as polyethylene bags or wrappings.

Another is to provide additional accelerator to the adhesive composition employed such that while migration will occur, sufficient accelerator will remain in the adhesive composition to ensure cure of the anaerobic resin within normal time periods. The increased accelerator level should be accompanied by a corresponding increase in inhibitor level.

Figure 2:
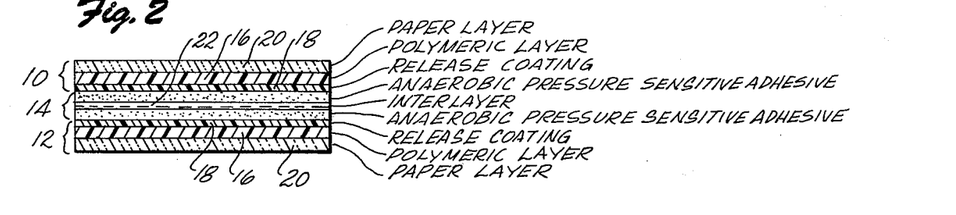
FIG. 2 - Illustrates another construction for a pressure sensitive anaerobic adhesive stock in sheet form which includes an interlayer.

With reference now to FIG. 2, there may be included as part of the composite construction an interlayer 22 to improve flexural bond strength in structural adhesive applications.

One property which must exist in many structural adhesive applications is a high degree of torsional shear which is to a great extent unrelated to lap shear. Torsional or flexural resistance to failure may be important to many end use applications.

To provide increased torsional shear there may be provided an interlayer 22 which will combine with or be bonded to the provided pressure sensitive anaerobic resin system upon cure.

There can, for instance, be provided a self-supporting film such as a polyester, like Mylar, which will, under curing conditions employed, establish a bond to over and undercoated layers of pressure sensitive adhesive providing an anaerobic resin system which will bond to the interlayer 22 and to the substrates to be joined to provide flexural strength to the joint.

As an alternative, there may be provided in the interlayer 22 an anaerobic resin which enhances the bond strengths upon cure while also improving torsional strength.

Yet another alternative is to provide a perforated web which may or may not be bonded to the anaerobic resin upon cure. In this instance, the perforations and the like become an integral part of the total cured polymer system to add desired flexural strength.

With reference now to FIG. 3, there is shown a configuration for a self-wound tape construction. All of the parameters set for the constructions described above apply.

Where a paper web 20 is used, it may, depending on packaging and service conditions, preferentially be dual coated with polymeric materials 16 upon which there is provided the differential release surfaces 18. In the alternative, there may be simply provided a single polymeric film 16 having applied differential release surfaces 18 and 18a.

In either event, it is preferred that the bond of the pressure sensitive layer including an anaerobic resin system have the lowest bond to release layer 18 as compared to release layer 18a to provide the most convenient transfer characteristics.

As indicated, with reference to FIGS. 1, 2, 3 and 4 the differential release surfaces 18 or 18 and 18a necessary for adhesive transfer can be provided by varying the nature of the release surface, typically a silicone release coating, or through their method of fabrication.

While nowise limiting, where common release materials are employed, the adhesive compositions, independent of their ultimate configuration, are typically applied from solvent systems or by other suitable film casting techniques. By applying the adhesive to one release surface, a greater bond will be created between the adhesive layer and the release surface due to some interaction while the second release surface has a relatively weak physical bond to the provided pressure sensitive adhesive layer.

Pressure sensitive adhesive layers provided in accordance with the present invention may be applied by a variety of known means. In either event, the total layer is applied through a solvent system, whereas the second release coated layer is typically applied subsequent to solvent evaporation.

Another method of providing the differential release surfaces is to have, do, the surface which is to be of lowest release value, a paper coated with a matte-finished polymeric layer, such as polyethylene, to which the release coating is applied followed by application of the adhesive layer. Because of interaction during solvent evaporation, the applied film becomes more strongly adherent to the release surface associated with the matte-finished polymer. The opposed release coating is applied to a smooth finished polyethylene or other polymeric coating. The bond only being physical, provides the required differential release surfaces.

Figure 4:
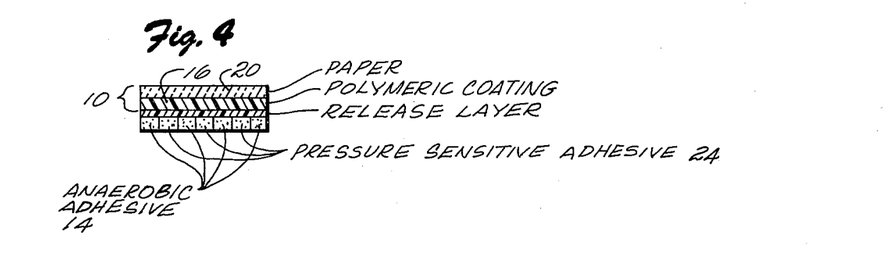
FIG. 4 - Illustrates a construction in which a provided adhesive system is heterogeneous.

With reference now to FIG. 4, there is provided yet another construction useful in accordance with the present invention. In that construction, there is employed a heterogeneous combination of a pressure sensitive adhesive 24 associated with an anaerobic adhesive 14 which may also be pressure sensitive in nature.

This is to meet the situation where there is required a bond between the surfaces to be bonded which is initially higher than that which can be provided by an anaerobic pressure sensitive adhesive prior to cure of the contained anaerobic resins.

Anaerobic resins do have a diluent effect on whatever polymer in which they are dissolved or otherwise combined. As a result, many conventional pressure sensitive adhesives have higher bond strength than can be achieved when combined with anaerobic resin.

To meet this need, there is contemplated the use of the heterogeneous combination in which a high bond strength pressure sensitive adhesive is employed to fixture two substrates together under high load or shear condition. There is also provided a viscoelastic anaerobic resin layer 14 which will not dilute the pressure sensitive adhesive and, upon cure, will provide the ultimate bond strength between the two surfaces. The viscoelastic anaerobic resin layer is of a nature that it has sufficient cohesive strength to preclude film splitting during transfer so that portions of the anaerobic resin will not remain with the release liner(s) during the adhesive transfer operation.

In this combination, the two systems provided may exist as alternate bars 24 and 14, as shown in FIG. 4, or as alternate dots or a heterogeneous system capable of laying down immiscible polymers by conventional manufacturing techniques.

What is also important in the heterogeneous combination is that the anaerobic adhesive layer, whether it be anaerobic alone or also pressure sensitive in nature, have sufficient integrity and viscosity per se or through the addition of fillers so as not to dilute the pressure sensitive adhesive.

In this combination there may be achieved high initial bond strength due to the presence of the undiluted pressure sensitive adhesive and high ultimate bond strength as a consequence of the subsequent cure of the anaerobic resin system. The configuration shown in FIG. 4 can be employed for the constructions shown in FIGS. 1 and 2 or for FIG. 3, upon the addition of another release layer (not shown) to the exposed side of paper layer 20.

Independent of the construction employed, care must be taken in preparing the tape and sheet construction to prevent premature cure or loss of activity during shelf life.

The anaerobic pressure sensitive adhesive compositions employed in the fabrication of sheets and tapes in accordance with this invention normally contain substantial quantities of anaerobic resins in order that the thermoplastic polymer system employed will not interfere to any great degree with thorough and complete cross-linking or curing of the anaerobic resin system and to maximize ultimate bond upon cure. The anaerobic pressure sensitive adhesive compositions may contain, based on a total weight of anaerobic resin system and the thermoplastic polymer system, and if present, tackifiers, from 35 to 99% by weight anaerobic resin system, preferably from about 55 to about 95% by weight and more preferably from about 70 to about 90% by weight.

For most applications, care should be taken in preparing the anaerobic pressure sensitive adhesives of this invention to cope with trace transition metal ions which may be present in each constituent of the composition including the anaerobic resin system and the thermoplastic polymer system, typically picked up from the vessels and systems used in their production.

If allowed to remain in the composition, the transition metal ions, while present in concentrations too low to complete cure, may, even at room temperature, consume a certain quantity of the peroxy initiator. As a result, sufficient tackiness may be retained so that pressure sensitive adhesive properties will not be destroyed, but the ability of the composition to cure may diminish to a degree that ultimate bond strength will not be structural. That is, a cross-linked latticework will not develop throughout the applied pressure sensitive composition and cohesive failure may result. If necessary, this effect in the compositions of this invention may be controlled by means, such as chelation, known to the art. When accelerated cure is desired, however, transition metal compounds (e.g., copper salts) may advantageously be used as primers or activators external to the pressure sensitive anaerobic composition of the invention.

One way to cope with the metal ions is to scavenge them prior to or following their admixture in a mutually compatible solvent prior to casting of the pressure sensitive adhesive layer onto a release liner, which may also require scavenging.

Typical of the solvents which are employed for dissolving the constituents of the pressure sensitive compositions are nonpolar aliphatics, aromatics, alcohols, and the like which will not affect the peroxy compound. Ketones, for instance, should be avoided. Among the suitable solvents there may be mentioned toluene, isopropyl alcohol and mixtures thereof.

If the constituents of the pressure sensitive adhesive composition are properly scavenged, the active metals can be reintroduced, but in another form. Rather than being active in the composition, their effect may be rendered latent by encapsulating them in microspheres such that they will not be in contact with the peroxy initiator until the microspheres are ruptured upon the application of pressure to react with the peroxy compound to accelerate cure.

An alternative route to prevent premature cure during shelf life or storage is to encapsulate the peroxy compound alone or with its accelerators. The the active metals or metal ions can be left in the pressure sensitive adhesive composition without fear that premature cure or deactivation will occur.

With care being taken to isolate the peroxy compound of the catalyst system by encapsulation or the elimination or isolation of active metal or metal ions, the pressure sensitive adhesive ingredients can be cast into a film on release coated surfaces without fear that premature cure or deactivation will occur.

Coating weight of the cast pressure sensitive layers may be varied over a wide range with the general object of achieving surface wetting for a strong and tenacious bond. Typical coating weights are, after solvent evaporation, from about 12 to about 40 grams of net solids per square meter.

What is required is that the applied anaerobic pressure sensitive adhesive layer be removable from the release liner of maximum interfacial bond, typically a silicone coated liner, for transfer to a substrate without cohesive disruption of the anaerobic pressure sensitive adhesive layer. It is desirable for any given application to have the coating as thin as conveniently possible when the surface(s) to which the anaerobic pressure sensitive adhesive is applied provides the active metal accelerator. Cross-linking will then rapidly occur throughout the anaerobic resin and the surface will be bonded together. If the coating is too thick, longer cure times will be required or there would be formed an internal weakness which could result in cohesive failure of the partially cured resin.

As an alternative, by employing microencapsulated accelerators within the pressure sensitive adhesive composition, greater cure rates and complete cure can be realized. Surface priming with accelerators may also be employed.

In substance, the total anaerobic pressure sensitive adhesive system acts as a binding agent for the anaerobic monomers until cure is complete and then the residual constituents only serve as fillers for the system. However, higher thermoplastic polymer system concentrations can also aid in improving flexural strength of the cured composition at some potential sacrifice in shear strength.

The types of products typically formed are the self-wound tapes, the surface of the supporting tape having differential release properties, sandwich constructions in which the anaerobic pressure sensitive adhesive composition is contained between two carrier liners having differential release surfaces, and similar products. All that is necessary is that the anaerobic pressure sensitive adhesive layer be transferable to a substrate and completely separated from its carriers to leave only an anaerobic pressure sensitive adhesive in contact with the substrate to be bonded to another substrate.

In the following Examples, one or more of the following anaerobic resin systems were employed for the formulation of anaerobic pressure sensitive adhesive compositions:

RESIN I

Approximately 75% of a reaction product of two moles of hydroxypropyl methacrylate with one mole of methylene-bis-phenyl-4,4'-diisocyanate and 25% triethyleneglycol dimethacrylate.

RESIN II

Approximately 66% of a polymer formed by hydroxypropyl methacrylate capping of a 1:1 adduct of toluene diisocyanate and hydrogenated 2,2-bis(4-hydroxyphenyl) propane, 26% hydroxypropyl methacrylate, 7% acrylic acid and 1% methacryloxypropyltrimethoxysilane.

The following test methods were employed in evaluating the pressure sensitive properties and properties of the cured endproducts. In determining pressure sensitive adhesive load bearing properties, the adhesive composition was cast on a suitable support such as paper or Mylar™.

Static Shear Strength-Federal Test Method Std. No. 147B, Method 20.1 (Load 250 grams) 180° Peel (dynamic-12 inches /min)-ASTM D-1000/68 Tack-Tack Rolling Ball Method-PSTC-6/70 Lap Shear-ASTM D-1002/64

EXAMPLE I

To a heated flask equipped with a stirrer and a reflux condenser there was added 1800 grams of toluene, 1200 grams of Resin I and 300 grams of Resin II. The mixture was heated with stirring at 70° C until a homogeneous solution was formed. To the stirred solution there was added 300 grams of a thermoplastic vinyl chloride copolymer known as VAGH-2076, manufactured and sold by Union Carbide Corp., and the mixture stirred until it again became homogeneous. To the resultant mixture there was added with stirring 180 grams of an aqueous alcoholic solution containing a chelating agent for trace transition metal ions. The solution was held at a temperature between 40–50° C and stirred for three hours and the chelated transition metal ions removed.

To this solution there was added 70 grams of cumene hydroperoxide containing quinone, 37 grams of benzoyl sulfimide and 37 grams of methylene-bis-dimethylaniline to form a catalyst system in the solution.

The anaerobic pressure sensitive adhesive solution was coated onto the release surface of a backing sheet fabricated from a plastic film and a paper having a silicone release coating. Coating weight after solvent removal was 28 grams per square meter. Another release sheet was applied to protect the anaerobic pressure sensitive adhesive.

A portion of the anaerobic pressure sensitive adhesive was tested for pressure sensitive properties. When applied to a paper support, the 250 gram static shear value was 5.5 minutes. The 180° peel test value on a Mylar support was 1.75 lbs/in and failure was cohesive. Tack was about 2 inches.

Two aluminum alloy plates measuring 1 × 4 × 1/16 were each etched on one end with a mixture of chromic and sulfuric acids to form a roughened surface. To one roughened surface there was applied a ½× 1 layer of the anaerobic pressure sensitive adhesive. The roughened end of the other plate was placed on the anaerobic pressure sensitive adhesive in overlapping relation thereby excluding oxygen and initiating cure. The copper in the aluminum alloy accelerated cure and the anaerobic pressure sensitive adhesive bonded plates were allowed to cure for 24 hours at room temperature. The bonded plates were tested in an Instron tester and the bond was found to give a lap shear tensile value of 900 psi.

EXAMPLE II

To a reactor equipped with a stirrer there was added at room temperature and with agitation 500 grams of toluene and 350 grams of oil soluble, non-heat-reactive phenolic novolak resin tackifier known as Arofene 8318 (manufactured by Ashland Chemical Co.) Agitation was continued until a solution resulted.

To another reactor there was added with stirring 2700 grams of a polyurethane resin known as Witcobond -380, (manufactured by Witco Chemical Co.) 500 grams of toluene and 1000 grams of isopropanol until a solution was formed.

The contents of both reactors were combined and thoroughly mixed. To the resultant solution there was added 500 grams of an alcohol solution containing a chelating agent for transition metals and the mixture stirred for three hours at room temperature.

To the solution there was added 4000 grams of Resin I and the mixture stirred until a solution resulted.

The resultant solution there was added a catalyst system comprising 240 grams of cumene hydroperoxide containing quinone, 240 grams of benzoyl sulfimide and 240 grams of methylene-bisdimethylaniline.

As in Example I, the anaerobic pressure sensitive adhesive was coated on the release surface of a support and residual solvent removed to form an anaerobic pressure sensitive layer of a weight of 28 grams per square meter. The formed adhesive layer was protected with a second release coated sheet.

The resultant anaerobic pressure sensitive adhesive layer, prior to cure, was determined to have a 250 gram static shear value of from 2.2. to 3.4 hours, a 180° peel value Mylar of 1 lb/in and a tack of about 1 inch.

The procedure of Example I to determine lap shear was repeated. The lap shear tensile value was determined to be about 1200 psi.

EXAMPLE III

Estane -5703, a polyurethane resin manufactured by Goodrich Chemical Co., is hot-melt coated on a silicone release coated paper to form a polyurethane film of a thickness of about 3 mils. To the exposed surface there is applied a coating of the anaerobic pressure sensitive adhesive composition described in Example I. After solvent evaporation, the release coated paper is removed exposing the opposed surface of the polyurethane film to which a second coating of the anaerobic pressure sensitive adhesive composition of Example I is applied. In each instance, the coating weight on each side of the case polyurethane film is about 28 grams per square meter. Employing the lap shear test of Example I, the polyurethane interlayer is found to provide 1300 psi lap shear after a two hour cure cycle at 160° F.

What is claimed is:
1. An anaerobic pressure sensitive adhesive stock comprising:
   a. a first release coating on a self-supporting adhesive stock comprising:
   b. a transferable and curable pressure sensitive adhesive layer having one surface in contact with said first release coating, said pressure sensitive adhesive layer including a thermoplastic polymer system containing at least one thermoplastic polymer selected from the group consisting of polyvinyl chloride, polyvinyl ether, polyvinyl acetate, polyurethanes, polyesters, polyamids, acrylic polymers, natural elastomers, and synthetic elastomers; a curable anaerobic resin system comprising at least one anaerobic resin containing at least two polymerizable acrylic ester groups, each individually having the formula:

wherein $R^2$ is a radical selected from the group consisting of hydrogen, halogen and a lower alkyl containing from 1 to about 4 carbon atoms, said anaerobic resin system being present in an amount of from about 35 to about 95% by weight based on the total weight of the anaerobic resin system and the thermoplastic polymer system in the pressure sensitive adhesive layer and a catalyst system for curing said curable anaerobic resin system by activation of a provided peroxy initiator in the presence of an accelerator and upon the substantial exclusion of oxygen, the thermoplastic polymer system, anaerobic resin system and catalyst system in combination and in a substantially solvent free state forming the pressure sensitive adhesive layer having a static shear strength of at least 2 minutes at a 250 gram load per 0.25 square inch and a 180° peel value of at least about 0.5 lbs per inch prior to cure of said anaerobic resin system; and     c. a second release coating on a self-supporting release liner in contact with the opposed surface of said transferable pressure sensitive adhesive layer, the bond of the first release coating to the transferable pressure sensitive adhesive layer being less than the cohesive strength of said pressure sensitive adhesive layer and exceeding the bond of said second release coating for said pressure sensitive adhesive layer to permit the pressure sensitive adhesive layer including the thermoplastic polymer system, the anaerobic resin system, and the catalyst system to be preferentially separated from said second release coating for application and bonding to a substrate prior to separation of the pressure sensitive adhesive layer from said first release coating without cohesive failure of said pressure sensitive adhesive layer.

2. An anaerobic pressure sensitive adhesive stock as claimed in claim 1 in which the first release coating and the second release coatings are contained on opposed sides of a common release liner and the stock is formed into a roll, said second release coating being on the undersurface of said release liner.

3. An anaerobic pressure sensitive adhesive stock as claimed in claim 1 in which the first and second release coatings are contained on separate release liners.

4. An anaerobic pressure sensitive adhesive stock as claimed in claim 1 in which the pressure sensitive adhesive layer including the curable anaerobic resin system comprises a first pressure sensitive adhesive layer separated at least in part from a second pressure sensitive adhesive layer by an interlayer to which the two pressure sensitive adhesive layers are secured, said interlayer providing support for said first and second pressure sensitive adhesive layers including the anaerobic resin system and catalyst and improved flexural strength upon cure of said anaerobic resin system.

5. An anaerobic pressure sensitive adhesive stock as contained in claim 4 in which the interlayer is perforated to permit communication between the first and second pressure sensitive adhesive layers including the anaerobic resin system.

6. An anaerobic pressure sensitive adhesive stock as claimed in claim 1 in which first and second release coatings are in contact with polymeric barrier layers which are impervious to the diffusion therethrough of an organonitrogen compound present as an accelerator in the catalyst system.

7. An anaerobic pressure sensitive adhesive stock as claimed in claim 6 in which each of the polymeric barrier layers is applied to a self-supporting paper base.

8. A pressure sensitive adhesive stock as claimed in claim 6 in which the first and second release coatings are in contact on opposed sides with a common self-supporting polymeric barrier layer.

9. An anaerobic pressure sensitive adhesive stock as claimed in claim 6 in which the first and second release coatings are applied to a separate self-supporting polymeric barrier layer.

10. An anaerobic pressure sensitive adhesive stock as claimed in claim 7 in which the barrier layers are polyethylene.

11. An anaerobic pressure sensitive adhesive stock as claimed in claim 6 in which one of the polymeric barrier layers is matte-finished and the other of said polymeric barrier layers is smooth.

12. An anaerobic pressure sensitive adhesive stock as claimed in claim 1 in which a tackifying resin is present in the pressure sensitive adhesive layer.

13. An anaerobic pressure sensitive adhesive stock as claimed in claim 1 in which the pressure sensitive adhesive layer is heterogeneous and which includes pressure sensitive adhesive segments containing at least one of said thermoplastic polymers contiguous to viscoelastic anaerobic resin segments, said viscoelastic anaerobic resin segments having sufficient cohesive strength to prevent film splitting during transfer.

14. An anaerobic pressure sensitive adhesive stock as claimed in claim 1 in which the contained curing system for said anaerobic resin system includes a microencapsulated compound proving an active transition metal which is capable of accelerating cure upon rupture of the microcapsules.

15. An anaerobic pressure sensitive adhesive stock as claimed in claim 1 in which the peroxy initiator of said contained catalyst system is microencapsulated, the cure of said anaerobic resin system being initiated upon rupture of said microcapsules.

16. An anaerobic pressure sensitive adhesive stock as claimed in claim 1 in which the included anaerobic resin system contains at least one anaerobic resin selected from the group consisting of the reaction product of 2 mols of hydroxypropyl methacrylate with methylene-bis-phenyl-4,4'-diisocyanate; hydroxypropyl methacrylate-capped reaction product of a 1:1 adduct of toluene diisocyanate and hydrogenated 2,2-bis (4-hydroxyphenyl) propane; and mixtures thereof.

17. An anaerobic pressure sensitive adhesive stock as claimed in claim 1 in which the catalyst system is present in an amount of from about 0.5 to about 20 percent by weight based on the total weight of the thermoplastic polymer system and the anaerobic resin system.

18. An anaerobic pressure sensitive adhesive stock comprising:

a. a first release coating on a self-supporting release liner;

b. a transferable pressure sensitive adhesive layer having one surface in contact with said first release coating and comprising a curable anaerobic resin system comprising at least one anaerobic resin containing at least two polymerizable acrylic ester groups, each group individually having the structure:

wherein R² is a radical selected from the group consisting of hydrogen, halogen and a lower alkyl containing from 1 to about 4 carbon atoms homogeneously mixed with a thermoplastic polymer system comprised of at least one high molecular weight thermoplastic polymer selected from the group consisting of polyvinyl chloride, polyvinyl ethers, polyvinyl acetates, acrylic based polymers, polyurethanes, polyesters, polyamides, natural elastomers and synthetic elastomers, and a catalyst system for curing said anaerobic resin system by activation of a provided peroxy initiator in the presence of an accelerator, said anaerobic resin system being present in an amount of from about 35 to about 95% by weight based on the weight of said anaerobic resin system and said thermoplastic polymer system, said transferable pressure sensitive adhesive layer when in a substantially solvent free state having, prior to cure of said anaerobic resin system, a static shear strength of at least about 2 minutes at a 250 gram load per 0.25 square inch and 180° peel value of at least about 0.5 lb per inch; and c. a second release coating on a self-supporting release liner in contact with the opposed surface of said transferable pressure sensitive adhesive layer, the bond of the first releast coating to the transferable pressure sensitive adhesive layer being less than the cohesive strength of said pressure sensitive adhesive layer and exceeding the bond of said second release coating for said pressure sensitive adhesive layer to permit the pressure sensitive adhesive layer including the thermoplastic polymer system, the anaerobic resin system, and the catalyst system to be preferentially separated from said second release coating for application and bonding to a substrate prior to separation of the pressure sensitive adhesive layer from said first release coating without cohesive failure of said pressure sensitive adhesive layer.

19. An anaerobic pressure sensitive adhesive stock as claimed in claim 18 in which the catalyst system is present in an amount of from about 0.5 to about 20 percent by weight based on the total weight of the thermoplastic polymer system and the anaerobic resin system.

20. An anaerobic pressure sensitive adhesive stock as claimed in claim 18 in which the first release coating and the second release coatings are contained on opposed sides of a common release liner and the stock is formed into a roll, said second release coating being on the undersurface of said release liner.

21. An anaerobic pressure sensitive adhesive stock as claimed in claim 18 in which the first and second release coatings are contained on separate release liners.

22. An anaerobic pressure sensitive adhesive stock as claimed in claim 18 in which the pressure sensitive adhesive layer including the curable anaerobic resin system comprises a first pressure sensitive adhesive layer separated at least in part from a second pressure sensitive adhesive layer by an interlayer to which the two pressure sensitive adhesive layers are secured, said interlayer providing support for said first and second pressure sensitive adhesive layers including the anaerobic resin system and catalyst system and improved flexural strength upon cure of said anaerobic resin system.

23. An anaerobic pressure sensitive adhesive stock as contained in claim 22 in which the interlayer is perforated to permit communication between the first and second pressure sensitive adhesive layers including the anaerobic resin system.

24. An anaerobic pressure sensitive adhesive stock as claimed in claim 18 in which the first and second release coatings are in contact with polymeric barrier layers which are impervious to the diffusion therethrough of an organonitrogen compound present as an accelerator in the catalyst system.

25. An anaerobic pressure sensitive adhesive stock as claimed in claim 15 in which the included anaerobic resin system contains at least one anaerobic resin selected from the group consisting of the reaction product of 2 mols of hydroxypropyl methacrylate with methylene-bis-phenyl-4,4' diisocyanate; hydroxypropyl methacrylate-capped reaction product of a 1:1 adduct of toluene diisocyanate and hydrogenated 2,2-bis (4-hydroxphenyl) propane; and mixtures thereof.

26. An anaerobic pressure sensitive adhesive stock as claimed in claim 18 in which the anaerobic resin system is present in an amount of from about 55 to about 95% by weight based on the total weight of said anaerobic resin system and said thermoplastic polymer system.

27. An anaerobic pressure sensitive adhesive stock as claimed in claim 18 in which a tackifying resin is present in the transferable pressure sensitive adhesive layer.

28. An anaerobic pressure sensitive adhesive stock as claimed in claim 12 in which the anaerobic resin system is present in an amount of from about 35 to 99% by weight based on the total weight of said anaerobic resin system, said thermoplastic polymer system and said tackifying resin.

* * * * *

UNITED STATES PATENT AND TRADEMARK OFFICE
CERTIFICATE OF CORRECTION

PATENT NO. : 3,993,815

DATED : November 23, 1976

INVENTOR(S) : Maurice Douek et al

It is certified that error appears in the above-identified patent and that said Letters Patent are hereby corrected as shown below:

Column 2, line 33, "organi-" should read -- organoni --.

Column 7, line 41, "anaerobic pressure sensitive adhesive," should read -- "anaerobic pressure sensitive adhesive" --.

Column 7, line 66, "grab" should read -- "grab" --.

Column 8, line 11, "pressure sensitive adhesive" should read -- "pressure sensitive adhesive" --.

Column 8, line 15, "anaerobic pressure sensitive adhesive" should read -- "anaerobic pressure sensitive adhesive." --.

Column 13, line 44, "1 x 4 x 1/16" should read -- 1"x4"x1/16"--.

Column 13, line 47, "1/2x1" should read -- 1/2"x1" --.

Column 13, line 68, "cobond -380" should read -- cobond-308 --.

Column 14, line 30, "Estane -4703" should read -- Estane - 5703 --.

Column 14, lines 48-49, "a. a first release coating on a self-supporting adhesive stock comprising:" should read -- a. a first release coating on a self-supporting release liner; --.

Column 15, line 56, "resin system and catalyst and improved flexural" should read -- resin system and catalyst system and improved flexural --.

Signed and Sealed this

Nineteenth Day of April 1977

[SEAL]

Attest:

RUTH C. MASON
*Attesting Officer*

C. MARSHALL DANN
*Commissioner of Patents and Trademarks*